(12) United States Patent
Kim et al.

(10) Patent No.: US 11,885,501 B2
(45) Date of Patent: Jan. 30, 2024

(54) WATER SUPPLY DEVICE, AND STEAM SUPPLY DEVICE AND COOKING DEVICE INCLUDING SAME

(71) Applicant: LG ELECTRONICS INC., Seoul (KR)

(72) Inventors: Jihyun Kim, Seoul (KR); Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 753 days.

(21) Appl. No.: 16/482,629

(22) PCT Filed: Feb. 6, 2018

(86) PCT No.: PCT/KR2018/001529
§ 371 (c)(1),
(2) Date: Jul. 31, 2019

(87) PCT Pub. No.: WO2018/147609
PCT Pub. Date: Aug. 16, 2018

(65) Prior Publication Data
US 2020/0003426 A1   Jan. 2, 2020

(30) Foreign Application Priority Data

Feb. 7, 2017   (KR) ........................ 10-2017-0017041

(51) Int. Cl.
*F24C 15/00*   (2006.01)
*A47J 27/04*   (2006.01)
(Continued)

(52) U.S. Cl.
CPC ............. *F24C 15/003* (2013.01); *A47J 27/04* (2013.01); *F24C 7/085* (2013.01); *F24C 15/18* (2013.01); *A47J 2027/043* (2013.01)

(58) Field of Classification Search
CPC ... A47J 2027/043; A47J 27/04; F24C 15/003; F24C 7/085; F24C 15/18
See application file for complete search history.

(56) References Cited

U.S. PATENT DOCUMENTS

| 2001/0017510 A1* | 8/2001 | Hallsten ............... A47B 88/402 |
| | | 312/330.1 |
| 2009/0126392 A1* | 5/2009 | An ........................ F25D 23/126 |
| | | 220/361 |

(Continued)

FOREIGN PATENT DOCUMENTS

| CN | 2438166 Y | 7/2001 |
| CN | 200997100 Y | 12/2007 |

(Continued)

OTHER PUBLICATIONS

Chinese Office Action dated May 6, 2020 issued in Application 201880010579.6.

(Continued)

*Primary Examiner* — Nathaniel E Wiehe
*Assistant Examiner* — Dilnessa B Belay
(74) *Attorney, Agent, or Firm* — KED & Associates LLP

(57) ABSTRACT

A water supply device, and a steam supply device and a cooking device including the same are disclosed. The disclosed invention comprises: a housing installed in a body of a cooking device; a water tank having a storage space formed therein to store water, wherein the water tank is installed at the housing to be movable between an insertion position at which the inlet port is located in the receiving space and a withdrawal position in which the inlet port is exposed to the outside of the receiving space; and a connector which is installed at the housing so as to be movable in a longitudinal direction inside the receiving space, and (Continued)

moves in the longitudinal direction to move the water tank to the insertion position or the withdrawal position.

14 Claims, 11 Drawing Sheets

(51) Int. Cl.
*F24C 7/08* (2006.01)
*F24C 15/08* (2006.01)
*F24C 15/18* (2006.01)

(56) References Cited

U.S. PATENT DOCUMENTS

| | | | | |
|---|---|---|---|---|
| 2009/0250452 | A1* | 10/2009 | Tse | F24C 15/327 |
| | | | | 219/400 |
| 2013/0319994 | A1* | 12/2013 | Bringe | F24C 15/18 |
| | | | | 219/391 |
| 2014/0251304 | A1* | 9/2014 | Winkelmann | A47J 36/00 |
| | | | | 126/369 |

FOREIGN PATENT DOCUMENTS

| | | | |
|---|---|---|---|
| CN | 201218925 | Y | 4/2009 |
| CN | 203841512 | U | 9/2014 |
| CN | 205031075 | U * | 2/2016 |
| CN | 205031075 | U | 2/2016 |
| EP | 2 363 057 | A1 | 9/2011 |
| EP | 2 466 214 | | 6/2012 |
| FR | 2 958 719 | A1 | 10/2011 |
| KR | 10-0715610 | | 5/2007 |
| KR | 10-0787746 | | 12/2007 |
| KR | 10-0792024 | | 1/2008 |

OTHER PUBLICATIONS

International Search Report (with English Translation) and Written Opinion dated Jun. 7, 2018 issued in Application No. PCT/KR2018/001529.

Extended European Search Report dated Nov. 23, 2020 issued in Application EP 18 75 1990.

* cited by examiner

WATER SUPPLY DEVICE, AND STEAM SUPPLY DEVICE AND COOKING DEVICE INCLUDING SAME

CROSS-REFERENCE TO RELATED PATENT APPLICATIONS

This application is a U.S. National Stage Application under 35 U.S.C. § 371 of PCT Application No. PCT/KR2018/001529, filed Feb. 6, 2018, which claims priority to Korean Patent Application No. 10-2017-0017041, filed Feb. 7, 2017, whose entire disclosures are hereby incorporated by reference.

TECHNICAL FIELD

The present disclosure relates to a water supply device, a steam supply device and a cooking device that has the water supply device, more particularly, a water supply device that supplies water required for supplying steam into a cooking chamber such as an oven, and the like, and a steam supply device and a cooking device that has the water supply device.

BACKGROUND ART

Cooking devices may be used to cook food and may be installed in a kitchen space to cook food according to a user's intention. The cooking devices may be classified in various ways according to, for example, heat sources used therein, forms thereof, and types of fuel.

In classification according to the forms in which food is cooked, cooking devices may be classified as an open type cooking device and a closed type cooking device according to the form of space in which food is placed. Examples of the closed type cooking devices may include an oven, a microwave, and the like, and examples of the open cooking devices may include a cooktop, a hob, and the like.

The closed type cooking devices may include a space that is configured to receive food and that is closed, and the closed space may be heated to cook food. The closed type cooking devices may include a cooking chamber, which is a space being sealed when food placed therein is attempted to be cooked. The cooking chamber may be a space in which food is substantially cooked.

The above closed type cooking device may be divided broadly into a gas oven and an electric oven depending on a type of heat source. The gas oven may use a method in which gas is used as a fuel and it is ignited by supplying the gas to a plurality of burners, and food is cooked by flame generated as the supplied gas is burned. The electric oven, unlike the gas oven, may use a method in which a plurality of heaters are operated using electricity as a heat source, and the food is cooked by the heat emitted from the heaters.

Electric ovens may be faster than gas ovens in a speed of cooking and may have high thermal efficiency, and may have good stability, and the use of electric ovens is increasing.

Such an electric oven may further provide a function for cooking food using high frequency by adding electric parts that emit the high frequency, such as magnetron, so that various types of food may be cooked, or for cooking food using a heat emitted by a heater and high frequency emitted by the electric parts such as the magnetron.

Recently, a steam oven that cooks food using high-temperature steam has been released. The steam oven may have a function for injecting steam into the cooking chamber using the high-temperature steam and controlling humidity based on an amount of steam. The steam oven may provide multiple functions, for example, for preventing the food from being dried and performing cooking a large amount of food with multi-steps, as well as preventing taste from being degraded and flavor from being evaporated to maintain the taste and the flavor of the food.

In general, the steam oven may include a cabinet and defines an appearance, a housing that is disposed inside of the cabinet to define a cooking chamber, a door opens that opens and closes a front opening of the cooking chamber, and a steam supplier that supplies steam to an inside of the cooking chamber.

Further, the steam supplier may include a steam generator that generates steam and a water tank that supplies water to the steam generator. Between the water tank and the steam generator, a water supply pipe may be connected so that water in the water tank may be moved to a vapor generator. The steam generator may include a water storage in which water supplied by a water tank is accommodated, and a heater that generates steam by heating water in the water storage.

In the above-described steam oven, the water injected through the water tank may flow into the water storage through the water supply pipe, and the water introduced into the water storage may be heated by the heater to generate the steam, and the generated steam may be introduced into the cooking chamber and may be circulated through an inside of the cooking chamber, to cook the food using the steam.

In the steam oven described above, the water tank has a form of a simple container to store water. That is, in the steam oven in the related art, the water tank merely provides a function for simply storing and supplying water, but may not provide any other function for improving user convenience.

DISCLOSURE

Technical Problem

The present disclosure provides a water supply device that may provide improved user convenience to a user and a steam supply device and a cooking device including the same.

Further, the present disclosure further provides the water supply device that may reduce manufacturing cost of the water supply device and improve productivity of the water supply device, and reduce a difficulty in repair work of the water supply device and reduce repair cost of the water supply device, and the steam supply device and the cooking device including the same.

Further, the present disclosure also provides the steam supply device and the cooking device that may prevent power from being wasted and safety accidents from occurring due to overheating.

Technical Solution

According to an aspect of the present disclosure, a water supply device includes a housing that is installed in a main body of a cooking device and defines an accommodating space, and one side in a forward and rearward direction is provided to be opened to an outside of the main body; a water tank that defines a storage space to store water and has an inlet to define a passage to introduce water into the storage space, and is installed in the housing so that a position of the water tank is changed to an insertion position in which the inlet is placed in the accommodating space and a withdrawal position in which the inlet is exposed to an outside of the accommodating space; and a connector that is installed in the housing to be movable forward and rearward in the accommodating space and moves forward and rearward to change the position of the water tank to the insertion position or the withdrawal position, and the connector comprises a rear frame that faces a rear surface of the water tank and a pair of side frames that extends from both ends of the rear frame and faces a side of the water tank, and the water tank is coupled to the connector so that a movement of the water tank is performed together with a movement of the connector, and the water tank is coupled to the connector in a manner in which the rear frame and the pair of side frames surround the rear surface and both sides of the water tank, and an entire connector is placed inside of the accommodating space when the position of the water tank is the insertion position.

Further, according to an aspect of the present disclosure, a water supply device includes a housing that is installed in a main body of a cooking device and defines an accommodating space, and a front of which is opened to an outside of the main body; a water tank that defines a storage space to store water and is placed in the accommodating space so that the water tank is withdrawn to an outside of the housing and the main body through an open front of the housing; and a connector that is installed in the housing to be movable forward and rearward in the accommodating space and moves forward and rearward to change a position of the water tank, and the connector includes a rear frame that faces a rear surface of the water tank and a pair of side frames that extends from both ends of the rear frame and faces a side of the water tank, and the water tank is coupled to the connector so that a movement of the water tank is performed together with a movement of the connector, and the water tank is coupled to the connector in a manner in which the rear frame and the pair of side frames surround the rear surface and both sides of the water tank, and the connector is not exposed to the outside of the main body when the water tank is placed in the accommodating space.

Further, according to another aspect of the present disclosure, a steam supply device includes a steam generator operated to generate steam by heating water; a water supply device that supplies water supplied to the steam generator; and a connection pipe that connects the water supply device and the steam generator so that a passage through which the water supplied by the water supply device moves to the steam generator is formed, the water supply device includes a housing that is installed in a main body of a cooking device and defines an accommodating space, and one side in a forward and rearward direction is opened to an outside of the main body; a water tank that defines a storage space to store water and includes an inlet that defines a passage to introduce the water into the storage space, and is installed in the housing so that a position of the water tank is changed to an insertion position in which the inlet is placed in the accommodating space and a withdrawal position in which the inlet is exposed to the outside of the accommodating space; and a connector that is installed in the housing to be movable forward and rearward in the accommodating space and moves forward and rearward to change the position of the water tank to the insertion position or the withdrawal position, and the connector includes a rear frame that faces a rear surface of the water tank and a pair of side frames that extend from both ends of the rear frame and faces a side of the water tank, and the water tank is coupled to the connector so that a movement of the water tank is performed together with a movement of the connector, and the water tank is coupled to the connector in a manner in which the rear frame and the pair of side frames surround the rear surface and both sides of the water tank, and an entire connector is placed in the accommodating space when the position of the water tank is the insertion position.

Further, according to yet another aspect of the present disclosure, a cooking device includes a main body that defines a cooking chamber; and a steam supply device that is installed in the main body and supplies steam into the cooking chamber, and the steam supply device includes a steam generator operated to generate steam by heating water; a water supply device that supplies water supplied to the steam generator; and a connection pipe that connects the water supply device and the steam generator so that a passage through which the water supplied by the water supply device moves to the steam generator is formed, and the water supply device includes a housing that is installed in a main body of a cooking device and defines an accommodating space, and one side in a forward and rearward direction is opened to an outside of the main body; a water tank that defines a storage space to store water and an inlet to define a passage to introduce water into the storage space is provided at a front thereof, and is installed in the housing so that a position of the water tank is changed to an insertion position in which the inlet is placed in the accommodating space and a withdrawal position in which the inlet is exposed to the outside of the accommodating space; and a connector that is installed in the housing to be movable forward and rearward in the accommodating space and moves forward and rearward, and changes the position of the water tank into the insertion position or the withdrawal position, and the connector includes a rear frame that faces a rear surface of the water tank and a pair of side plates that extends from both ends of the rear frame and faces a side of the water tank, and the water tank is coupled to the connector so that a movement of the water tank is performed together with a movement of the connector, and the water tank is coupled to the connector in a manner in which the rear frame and the pair of side frames surround the rear surface and both sides of the water tank, and an entire connector is placed in the accommodating space when the position of the water tank is the insertion position.

With the above-described structure, various types of functions, for example, a function for fixing the water tank into the main body or withdrawing the water tank from the inside of the main body through a simple pressing operation, a function for introducing water into the water tank easily and conveniently without an additional operation to open and close an inlet, as well as effectively preventing foreign matters from being introduced into the water tank, a function for controlling an operation of the steam supply device according to a position of the water tank, a function for allowing the water tank to be withdrawn smoothly may be implemented with one water supply device, thereby providing enhanced user convenience to users.

Further, according to an aspect of the present disclosure, a water supply device includes a housing that is installed in a main body of a cooking device and defines an accommodating space, and one side in a forward and rearward direction is opened to an outside of the main body; a water tank that defines a storage space to store water and includes an inlet to define a passage to introduce water into the storage space in the front thereof, and is installed in the housing so that a position of the water tank is changed to an insertion position in which the inlet is placed in the accommodating space and a withdrawal position in which the inlet is exposed to an outside of the accommodating space; a connector that is installed in the housing to be movable forward and rearward within the accommodating space and moves forward and rearward to change the position of the water tank to the insertion position or the withdrawal position; and a power generator that provides power to move the water tank adjacent to the withdrawal position, and a fixer that is coupled to the connector and fixes the positions of the connector and the water tank, when the water tank is placed at the insertion position, is installed in the housing, and the power generator includes an elastic member one side of which is coupled to the housing and the other side of which is coupled to the connector, and in which, when the connector moves rearward, a distance between one side and the other side of the elastic member is increased, to generate an elastic force in a direction of moving the connector forward, and the connector includes a structure to movably couple the water tank to the housing, a structure in which the other side of the elastic member is connected to the connector, and a fixing boss that is coupled to the fixer so that the positions of the connector and the water tank are fixed when the water tank is placed at the insertion position, and the water tank is coupled to the connector so that a movement of the water tank is performed together with a movement of the connector, and is detachably coupled to the connector so that the connector is separated from the housing.

Preferably, the water tank is detachably coupled to the connector so that the water tank may be separated from the connector and the housing.

As a result, it is possible to lower manufacturing cost of the water supply device and improve the productivity of the water supply device, and reduce a difficulty in repair work of the water supply device and reduce the repair cost of the water supply device, and to easily and quickly remove the water tank for cleaning or repair.

Further, the present disclosure includes an insertion detector that detects whether the position of the water tank is the insertion position, and the water tank includes a water tank nozzle that defines a passage to move water stored in the storage space to an outside of the water tank and protrudes rearward of the water tank, and the housing is installed with a tube supporter that is detachably coupled to the water tank nozzle and connects the water tank nozzle to the connection pipe, and the water tank nozzle is coupled to the tube supporter when the water tank is placed at the insertion position, and the insertion detector contacts the water tank and detects that the water tank is placed at the insertion position, and the steam generator is operated only when the insertion detector detects that the water tank is placed at the insertion position.

Thus, it is possible to prevent the steam heater from being unnecessarily operated when the water supply is not performed, thereby preventing power from being wasted due to unnecessary operation of the steam heater and safety accidents from occurring due to overheating of the steam heater.

Hereinafter, an embodiment of a water supply device and a steam supply device and a cooking device that has the water supply device according to the present disclosure will be described with reference to the accompanying drawings. For convenience of explanation, thicknesses of lines and sizes of components shown in the figures may be exaggerated for clarity and convenience of explanation. Further, terms described below are defined in consideration of functions of the present disclosure, which may vary depending on an intention or custom of users, and operators. Therefore, definitions of these terms should be made based on the contents throughout the present disclosure.

<Structure of Cooking Device>

Figure 1:
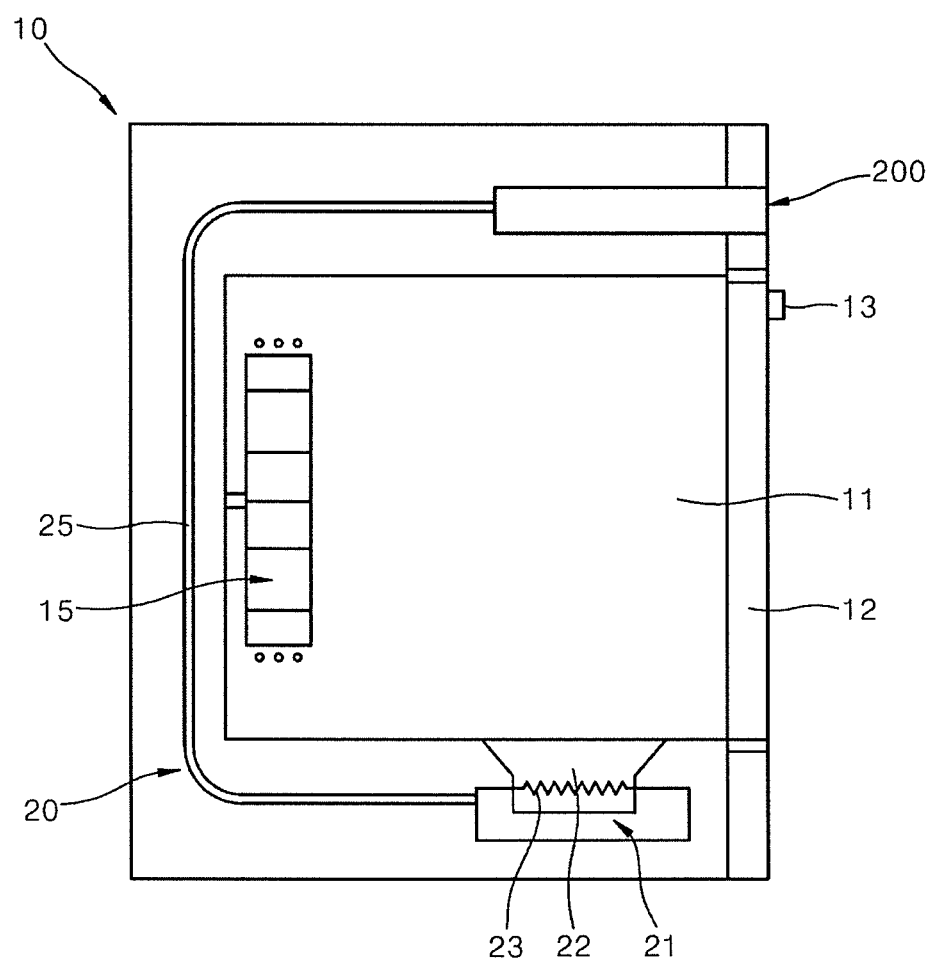
FIG. 1 is a schematic side cross-sectional view of a cooking device according to an embodiment of the present disclosure.
Figure 2:
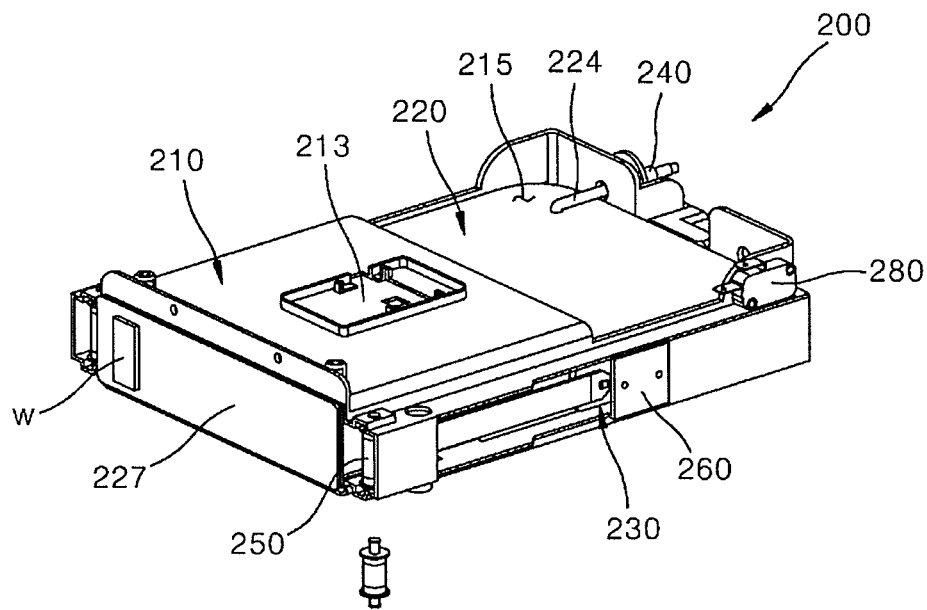
FIG. 2 is a perspective view of a water supply device according to an embodiment of the present disclosure.

FIG. 1 is a schematic side cross-sectional view of an inner configuration of a cooking device according to an embodiment of the present disclosure. FIG. 2 is a perspective view of a water supply device according to an embodiment of the present disclosure.

Referring to FIG. 1, according to an embodiment of the present disclosure, an appearance of the cooking device is defined by a main body 10. For example, a case in which the main body 10 is a closed type cooking device such as an oven is described below.

The main body 10 may include a substantially rectangular parallelepiped shape and is made of a material that has a predetermined strength to protect a plurality of parts installed in an inner space of the main body 10. A cooking chamber 11 to provide a space in which food is cooked is placed in the inner space of the main body 10.

The cooking chamber 11 has a form of a hexahedron whose front surface is open. The cooking device heats an inner space of the cooking chamber 11 to cook food when the cooking chamber 11 is closed. That is, in the cooking device in this embodiment, food is substantially cooked in the internal space of the cooking chamber 11.

A convection heater 15 that heats the internal space of the cooking chamber 11 by convecting hot air may be provided at a rear of the cooking chamber 11. An upper heater that heats the internal space of the cooking chamber 11 from above may be provided at an upper portion of the cooking chamber 11. Further, a lower heater that heats the internal space of the cooking chamber 11 from the lower portion may be provided at the lower portion of the cooking chamber 11 as a heater.

A door 12 that selectively opens and closes the cooking chamber 11 is rotatably provided in the main body 10. For example, the door 12 may open and close the cooking chamber 11 in a pull-down manner in which an upper end of the door 12 is vertically rotated about a lower end of the door 16. The door 12 has a hexahedron shape that has a substantially predetermined thickness. A handle 17 may be installed at a front surface of the door 12 to be gripped by the user when the user rotates the door 16.

A steam supply device 20 may further be provided inside of a main body 10. The steam supply device 20 is installed in the main body 10 and supplies steam to an inside of the cooking chamber 11 and may include a steam generator 21, a water supply device 100, and a connection pipe 25.

The steam generator 21 generates steam by heating water. In the present embodiment, the steam generator 21 is installed at the lower side of the main body 10 to be placed below the cooking chamber 11. However, the present disclosure is not limited thereto, any position optimized in consideration of a detailed configuration of the steam generator 21, a structure of the cooking chamber 11, and an efficiency of supplying the steam determined based on the above may be selected as an installation position of the steam generator 21.

The steam generator 21 includes a heating tank 22 that accommodates water supplied by the water supply device 21 through the connection pipe 25 and a steam heater 23 that heats the water accommodated in the heating tank 22 to generate steam.

The water supply device 200 stores and supplies water to be supplied to the steam generator 21. In this embodiment, the water supply device 200 is installed above the main body 10 so that the water supply device 200 is placed above the cooking chamber 11. However, the present disclosure is not limited to thereto. The water supply device 200 may be installed at any selected position in which the water supply device is less influenced by heat in the cooking chamber 11 at high temperatures and the water tank 220 described below is easily withdrawn, and the water supply to the steam generator 21 is smoothly performed.

As shown in FIGS. 1 and 2, the water supply device 200 may include a housing 210 installed in the main body 10, a water tank 220 installed in the housing 210, and a connector 230 that withdrawably couples the water tank 220 to the housing 210. A detailed description of components included in the water supply device 200 is described below.

The connection pipe 25 connects the water supply device 200 and the steam generator 21 so that a passage through which the water supplied by the water supply device 200 moves to the steam generator 21 is formed. The connection pipe 25 may have a flexible tube form or a form of a pipe made of metal. Further, the connection pipe 25 may be connected to the steam generator 21 by bypassing the cooking chamber 11 from the water supply device 200 and may be connected to the steam generator 21 through a path bypassing to the rear side of the cooking chamber 11, and may be connected to the steam generator 21 through a path bypassing to the side of the cooking chamber 11.

In the cooking device of the present embodiment that has the above configuration, the water supplied by the water supply device 200 is introduced into the heating tank 22 through the connection pipe 25 and the water introduced into the heating tank 22 is heated by the steam heater 23 to generate the steam, and the generated steam is introduced into the cooking chamber 11 and circulates through an inside of the cooking chamber 11, to cook food using the steam.

At this time, the water supplied by the water supply device 200 may be supplied by a force generated by a height difference or a pressure difference between the water supply device 200 and the heating tank 22, or by power of a pump (not shown) provided adjacent to the heating tank 22 or the connection pipe 25.

[General Configuration of Water Supply Device]

Figure 3:
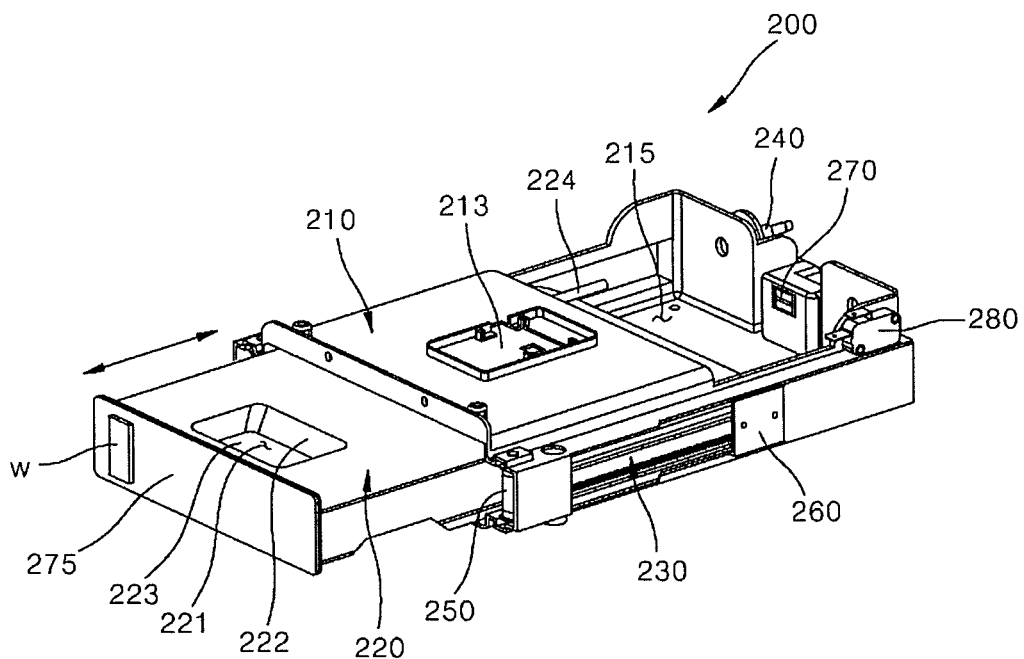
FIG. 3 is a perspective view of a state in which a water tank is withdrawn from the water supply device shown in FIG. 2.
Figure 4:
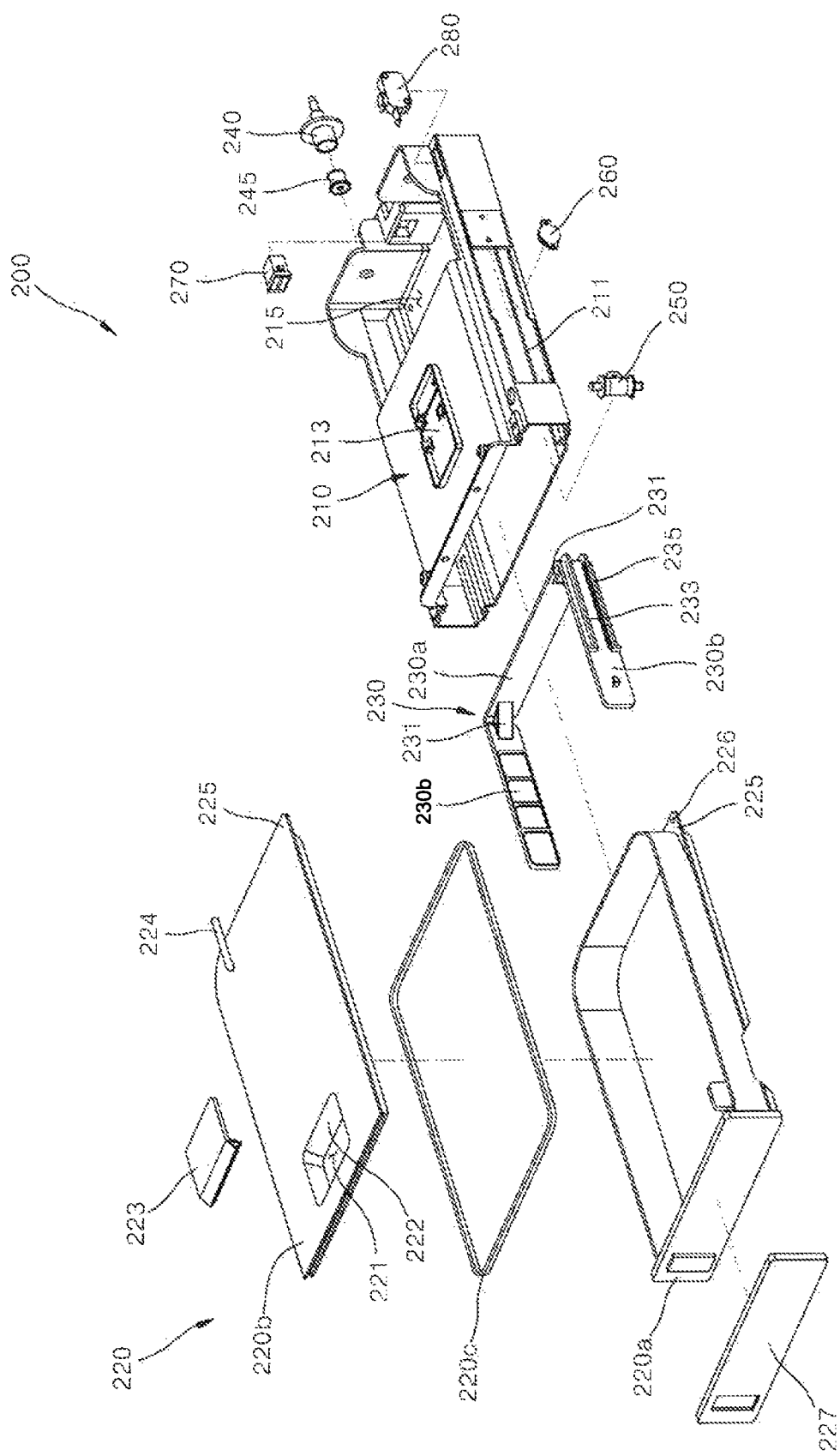
FIG. 4 is an exploded perspective view of a state in which the water supply device is exploded shown in FIG. 2.

FIG. 3 is a perspective view of a state in which a water tank is withdrawn from the water supply device shown in FIG. 2, and FIG. 4 is an exploded perspective view of a disassembled state of the water supply device shown in FIG. 2.

Referring to FIGS. 2 to 4, in this embodiment, a water supply device 200 may include a housing 210, a water tank 220, and a connector 230.

The housing 210 is installed in a main body 10 of a cooking device and has a box shape in which an accommodating space is formed in the housing 210. The housing 210 forms a skeleton to accommodate and install various types of components included in the water supply device 100, while the housing 210 functions as a coupling medium to couple the water supply device 200 to the main body 10.

In this embodiment, the housing 210 has a box shape of a hexahedron that has an accommodating space in the housing 210. One side of the housing 210 in the forward and rearward directions, that is, the front side of the housing 210, is formed to be opened so that the accommodating space formed therein may be opened outward of the main body 10. The accommodating space in the housing 210 is configured to accommodate the water tank 220 described below and the opened front of the housing 210 defines a passage so that the water tank 220 installed in the housing 210 is withdrawn to the outside of the main body 10.

A sterilizer mount 213 and an opening 215 may be provided on an upper surface of the housing 210. The sterilizer mount 213 enables the sterilizer to sterilize the water tank 220 or the water accommodated in the water tank 220 to be mounted on the housing 210, and the opening 215 allows a passage between an inside and an outside, of the housing 210, to be formed above the housing 210. For example, a UV sterilizer that provides a sterilization function in such a manner of releasing ultraviolet rays with wavelengths having a sterilization effect may be mounted on the sterilizer mount 213; however, a sterilizer that provides the sterilization function in multiple ways, in addition to the UV sterilizer, may be mounted on the sterilizer mount 213.

The water tank 220 stores water and supplies the stored water to the steam generator 21 (see FIG. 1). A storage space to store water is formed in the water tank 220.

In the present embodiment, the water tank 220 has a box shape of a hexahedron corresponding to the shape of the accommodating space inside of the housing 210. An inlet 221 to define a passage to introduce water into the storage space from the outside of the water tank 220 is provided at an upper portion of the water tank 220. The inlet 221 passes through the upper surface of the water tank 220 and is placed at a front side of the water tank 220.

The water tank 220 is installed inside of the housing 210 and is installed to be movable forward and rearward. The water tank 220 may be installed inside of the water tank 220 so that an entire area of the water tank 220 is placed in the accommodating space in the housing 210. The water tank 220 may also be withdrawn to the outside of the housing 210 and the main body 10 through the open front side of the housing 210.

That is, the water tank 220 is installed in the housing 210 to change its position to the insertion position and the withdrawal position. In this embodiment, the insertion position is defined as a position in which the entire area of the water tank 220 is inserted into the accommodating space in the housing 210 so that the inlet 221 formed at the front side of the water tank 220 is placed inside of the accommodating space of the housing 210, and the withdrawal position is defined as a position in which the water tank 220 is moved forward so that the inlet 221 is exposed to the accommodating space of the housing 210 and the outside of the main body 10.

The connector 230 movably couples the water tank 220 to the housing 210. The connector 230 is installed in the housing 210 to be movable forward and rearward within the accommodating space and functions to move forward and rearward to change the position of the water tank 220 to the insertion position or the withdrawal position.

The connector 230 includes a structure to movably couple the water tank 220 to the housing 210 and a structure to connect a part that provides a power to move the water tank 220 and a part that fixes the position of the water tank 220 into the housing 210.

That is, according to this embodiment, the water supply device 200 does not have a form in which a structure (for example, a sliding boss 233) that movably couples the water tank 220 to the housing 210, and a structure to which a part (e.g., a power generator 250) that provides a power to move the water tank 220 and a structure for connecting a part (e.g., a fixer 270) that fixes the position of the water tank 220 in the housing 210 to water tank 220 are directly provided in the water tank 220, but has a form in which these structures are provided in the connector 230 as a separate part from the water tank 220 and the water tank 220 is coupled to the connector 230 so that the water tank 220 includes the above structures indirectly through the connector 230.

When the above structures are provided directly on the water tank 220, a shape and a structure of the water tank 220 become excessively complicated, which makes the manufacturing of the water tank difficult and increases the manufacturing cost of the water tank. Further, when the connected portion between the water tank 220 and other parts is broken, an unreasonable situation in which not only water tank 220 but also the corresponding part has to be replaced occurs.

Further, when the water tank 220 that directly includes the above structures is installed in the housing 210, due to the complicated connection relationship formed between the water tank 220 and other parts, a problem that it is very difficult to remove the water tank 220 from the housing 210 for washing or repair, and the like, occurs.

In order to solve such a problem, in this embodiment, a component in which a component that stores water such as the water tank 220 and a component that movably installs the water tank 220 in the housing 210 like the connector 230 are provided separately, respectively, and the water tank 220 is movably installed in the housing 210 through the coupling with the connector 230 movably installed in the housing 210, and the water tank 220 and the connector 230 provided as separate components from each other are detachably coupled to each other.

According to the above, it is possible to separately manufacture two components that may be excessively complicated in shape and structure when two components are formed integrally, thereby improving productivity of the water supply device 200 and lowering the manufacturing cost of the water supply device 200 and lowering the difficulty in the repair operation of the water supply device 200 and repair cost of the water supply device 200 by separating a part that has a high risk of breakage in structure, such as the connector 230, as well as easily and quickly performing an operation of removing the water tank 220 from the housing 210 for washing, repair, and the like.

Further, according to this embodiment, the water supply device 200 may further include a power generator 250, a damper 260, a fixer 270, and an insertion detector 280.

The power generator 250 is connected to the connector 230 to provide a power to move the water tank 220 adjacent to the insertion position, and the damper 260 prevents a movement of the connector 230 to move the water tank 220. Further, the fixer 270 is coupled to the connector 230 and fixes the positions of the connector 230 and the water tank 220 when the water tank 220 is placed at the insertion position, and the insertion detector 280 detects whether the position of the water tank 220 is the insertion position.

Details of configurations and operation of the power generator 250, the damper 260, the fixer 270, and the insertion detector 280 are described below.

<Structure of Water Tank>

Figure 5:
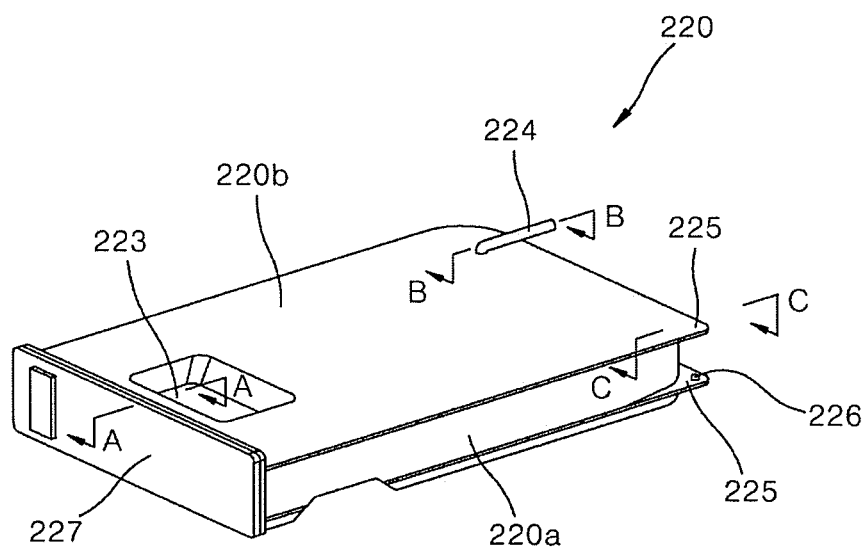
FIG. 5 is a perspective view of a water tank shown in FIG. 2.
Figure 6:
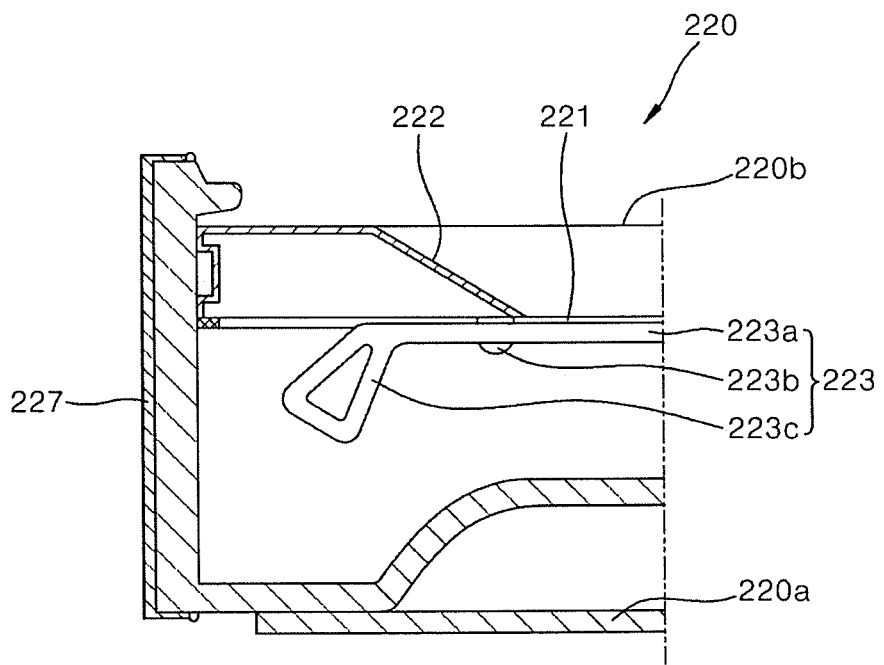
FIG. 6 is a cross-sectional view taken along line "A-A" in FIG. 5.
Figure 7:
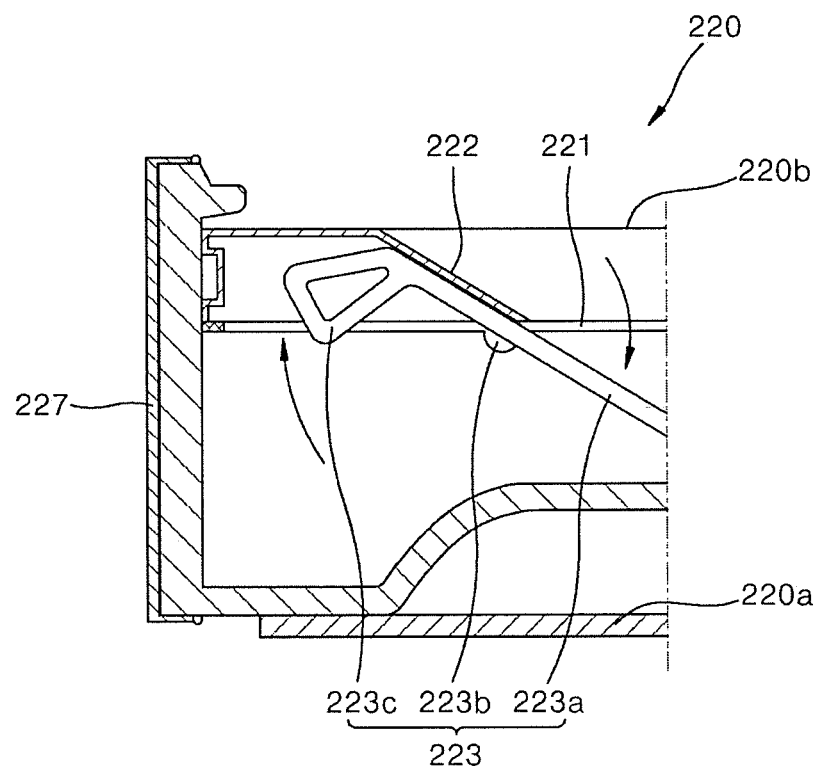
FIG. 7 shows an opening state of an inlet of an opening and closing holder shown in FIG. 6.
Figure 8:
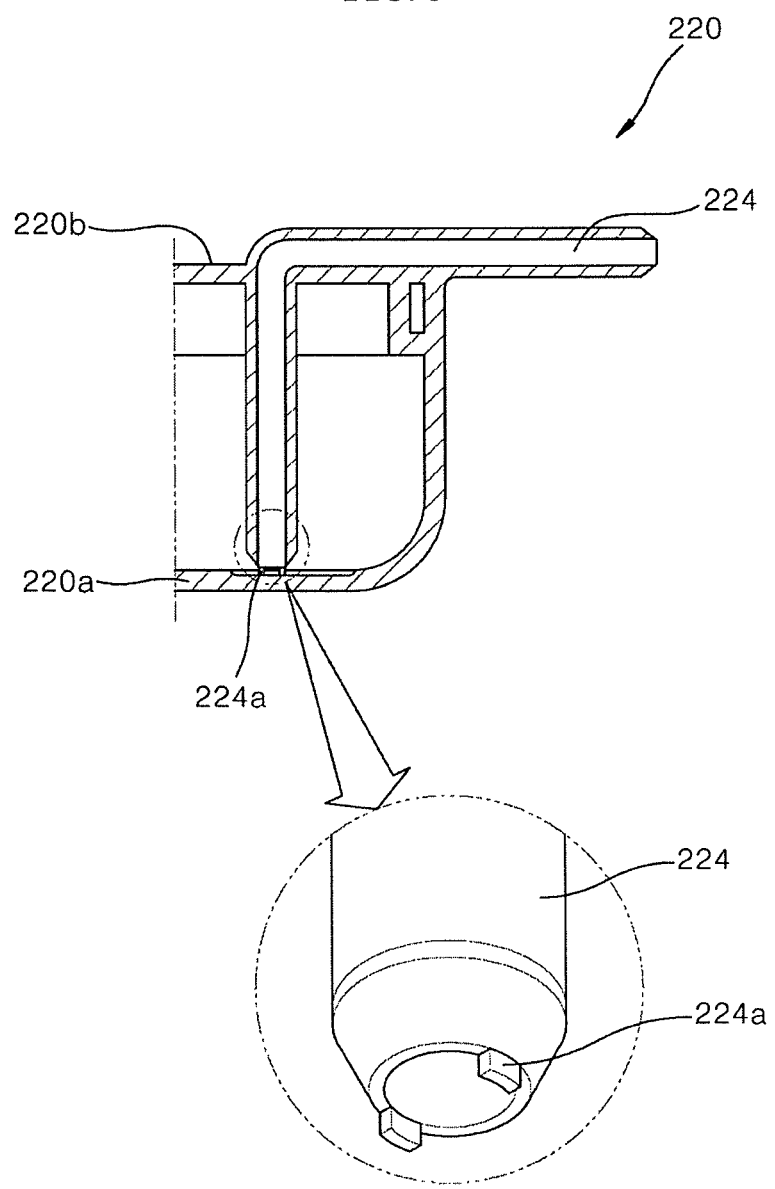
FIG. 8 is a cross-sectional view taken along line "B-B" in FIG. 5.

FIG. 5 is a perspective view of a water tank shown in FIG. 2 FIG. 6 is a cross-sectional view taken along line "A-A" in FIG. 5. Further, FIG. 7 shows opening of an inlet of an opening and closing holder shown in FIG. 6. FIG. 8 is a cross-sectional view taken along line "B-B" in FIG. 5.

Referring to FIGS. 4 and 5, in the present embodiment, a water tank 220 includes a lower tank 220a and an upper tank 220b.

The lower tank 220a has a box shape that has an open upper portion and the upper tank 220b is coupled above the lower tank 220a to cover the opened upper portion of the lower tank 220a. A storage space to store water is defined in the lower tank 220a that forms the lower portion of the water tank 220. The upper tank 220b that covers the opened upper portion of the lower tank 220a forms the upper surface of the water tank 220. A packing 220c made of silicone rubber that has a rectangular shape is interposed in a coupling portion of the lower tank 220a and the upper tank 220b to seal the coupling portion of the lower tank 220a and the upper tank 220b.

According to the present embodiment, the water tank 220 formed by coupling between the lower tank 220a and the upper tank 220b has a form of a box of a hexahedron, and an edge that connects a rear surface and a side of the water tank 220 has a curved shape.

An edge protruding surface 225 is formed on a lower surface of the lower tank 220a and an upper surface of the upper tank 220b, respectively. The edge protruding surface 225 protrudes from an edge having a curved shape to connect the rear surface and the side of the water tank 220 in a plane direction.

The edge protruding surface 225 formed as described above couples the water tank 220 to the connector 230. The water tank 220 is connected to the connector 230 through the edge protruding surface 225, and as a result, the water tank 220 is coupled to the connector 230 so that the movement of the water tank 220 is performed together with the movement of the connector 230. Further, the coupling between the water tank 220 and the connector 230 is performed so that the water tank 220 is separated from the connector 230 and the housing 210, as necessary, and details thereof is described below.

The water tank 220 formed as described above is movably installed in the housing 210, and is installed in the main body 10 through it, and is installed to be withdrawn to the outside of the main body 10, when necessary. The water tank 220 may be installed such that the front surface of the water tank 120 is exposed to the outside of the housing 210, as well as exposing to the outside of the main body 10. As described above, a decorative panel 227 may be attached onto the front surface of the water tank 220 which is exposed to the outside of the main body 10. Preferably, the decorative panel 227 is made of such material and has such color that may provide a detect of unity with an outer case that defines an appearance of the main body 10, thereby contributing to maintaining aesthetic quality of entire products.

Further, a water level display window w may be provided on the front surface of the water tank 220 and a portion of the decorative panel 227 attached thereto. The water level display window w is provided so that users may check the level of the water stored in the water tank 220 from the outside of the water tank 220 and the main body 10. The water level display window w may be formed in such a manner that a through-hole is formed in front surface of the water tank 220 and a portion of the decorative panel 227 and a cover made of a transparent material is attached thereto.

An inlet 221 which is a passage to introduce the water into the storage space from an outside of the water tank 220 passes through the upper surface of the water tank 220 provided by the upper tank 220b and the opening and closing holder 223 that opens and closes the inlet 221 is installed in the water tank 220 in which the inlet 221 is formed.

Referring to FIGS. 4 to 6, the opening and closing holder 223 is installed in the water tank 220 to be placed below the inlet 221, and is rotatably installed in the water tank 220, and opens and closes the inlet 221. In this embodiment, the opening and closing holder 223 includes a cover 223a, an extension 223c, and a hinge 223b.

The cover 223a covers under the inlet 221 and has a form of a plate that has an area that may cover the inlet 221 and is disposed under the inlet 221.

Further, the extension 223c extends from the cover 223a and extends from the cover 223a toward an outside of the inlet 221 with the hinge 223b therebetween, which is a coupling portion of the opening and closing holder 223 and the water tank 220. The hinge 223b corresponds to a portion that rotatably couples the opening and closing holder 223 to the water tank 220 between the cover 223a and the extension 223c.

According to the present embodiment, the extension 223c is placed below the upper tank 220b that is formed with the inlet 221, like the cover 223a, and a weight that provides a weight is formed in the extension 223c so that a center of gravity of the opening and closing holder 223 is placed biased adjacent to the extension 223c.

That is, the opening and closing holder 223 is installed in the water tank 220 so that the opening and closing holder 223 rotates in a direction in which the cover 223a ascends and the extension 223c descends (hereinafter; referred to as "a closing direction"), or the opening and closing holder 223 rotates in a direction in which the cover 223a descends and the extension 223c ascends (hereinafter; referred to as "an opening direction"), contrary to the above. The center of gravity of the opening and closing holder 223 is installed biased adjacent to the extension 223c.

According to the present embodiment, the inlet 221 is disposed below the upper surface of the water tank 220 formed by the upper tank 220b, and an inclined surface 222 that connects the upper surface of the water tank 220 and the inlet 221 in an inclined manner is formed around the inlet 221. The inclined surface 222 has a shape of an inclined partition wall surrounding around the inlet 221. The water introduced into the inlet 221 from an outside of the water tank 220 may be introduced into the inlet 221 through the inclined surface 222. An accommodating space that provides a space to move the extension 223c and the weight upward, when the opening and closing holder 223 rotates in the opening direction thereof is formed below the inclined surface 222.

The opening and closing holder 223 is disposed below the inclined surface 222. As the center of gravity of the opening and closing holder 223 is biased adjacent to the extension 223c, a force to always move the opening and closing holder 223 in the closing direction is acted to the opening and closing holder 223. The opening and closing holder 223 that rotates in the closing direction interferes with a lower end of the inclined surface 222 placed above thereof, so that further movement is restricted and the inlet 221 is closed.

As shown in FIG. 7, when the user pours water into the inlet 221 to supplement the water in the water tank 220, the water poured above the inlet 221 surrounded by the inclined surface 222 presses the cover 223a of the opening and closing holder 223. The force to rotate the opening and closing holder 223 in the opening direction is acted by the opening and closing holder 223 by the weight of the water pressing the cover 223a. As a result, as the opening and closing holder 223 rotates in the opening direction, the inlet 221 is opened, and the water may be introduced into the storage space of the water tank 220 through the opened inlet 221.

As shown in FIG. 6, when the supplement of the water is completed and the introduction of the water is stopped, as the opening and closing holder 223 rotates back in the closing direction to close the inlet 221, the foreign matters is prevented from being introduced into the water tank 220 when the water is stored in the water tank 220.

The weight of the weight provided in the opening and closing holder 223 operated as described above is preferably configured to derive the rotation of the opening and closing holder 223 in the closing direction to a degree in which the opening and closing holder 223 may stably close the inlet 221 and is configured such that the opening and closing holder 223 smoothly rotates in the opening direction by the weight of the water introduced in to the inlet 221 when the water is introduced into the inlet 221.

FIG. 8 shows a configuration of a water tank nozzle 224, which is a configuration to move water stored in a water tank 220 to the outside thereof as described above.

The water tank nozzle 224 is a configuration that has a passage to move the water stored in the storage space in the water tank 220 outward of the water tank 220 and at least a portion thereof protrudes rearward of the water tank 220.

In the present embodiment, the water tank nozzle 224 has a hard tube shape in which a portion inserted into the water tank 220 and a portion protruding to the outside of the water tank 220 has a "[" shape and are connected to each other. That is, a hollow is formed inside of the water tank nozzle 224 to define a passage through which the water stored in the storage space inside of the water tank 220 moves to the outside of the water tank 220, and the lower end of the water tank nozzle 224 is opened so that the hollow of the water tank nozzle 224 communicates with the outside of the water tank nozzle 224.

The lower end of the water tank nozzle 224 inserted into the water tank 220 is installed adjacent to a bottom surface of the water tank 220. It is preferable that a distance between the lower end of the water tank nozzle 224 and the bottom surface of the water tank 220 is formed as narrow as possible within a range in which the water may be introduced through the lower end of the water tank nozzle 224.

A distance between the lower end of the water tank nozzle 224 and the bottom surface of the water tank 220 may be set and maintained by a boss 224a that protrudes from the lower end of the water tank nozzle 224. According to the above, the boss 224a protrudes from the lower end of the water tank nozzle 224 toward the bottom surface of the water tank 220. The boss 224a formed as described above contacts the bottom surface of the water tank 220 to function to space an opened lower end of the water tank nozzle 224 apart from the bottom surface of the water tank 220. As a result, the lower end of the water tank nozzle 224 may maintain a distance to the bottom surface of the water tank 220 corresponding to a height of the boss 224a that protrudes from the lower end of the water tank nozzle 224. An area in which the lower end of the water tank nozzle 224 is placed in the bottom surface of the water tank 220, that is, a portion of the area in which the lower end of the water tank nozzle 224 contacts the boss 224a may be formed concavely downward compared to other areas of the bottom surface of the water tank 220 so that the lower end of the water tank nozzle 224 is placed at the lower portion in the water tank 220. As a result, the lower end of the water tank nozzle 224 in which the water is introduced into the water tank nozzle 224 may be placed at a height near the height of the bottom surface of the water tank 220, the water may be more smoothly moved through the water tank nozzle 224.

As shown in FIGS. 3 and 8, the outer protrusion of the water tank nozzle 224 protrudes rearward of the water tank 220 toward the rear side of the housing 110. A tube supporter 240 that detachably couples to the water tank nozzle 224 is installed on the rear side of the housing 210.

The tube supporter 240 is installed on the rear side of the housing 210 and one side of the tube supporter 240 facing the water tank 220 is exposed adjacent to the water tank 220 through the housing 210. One side of the tube supporter 240 is detachably coupled to the water tank nozzle 224 and the other side of the tube supporter 240 is connected to the connection pipe 25, and the water tank nozzle 224 and the connection pipe 25 are connected to each other via a connection with the tube supporter 240.

In addition, the tube supporter 240 may further include a packing gasket 245. The packing gasket 245 has a configuration in which the packing gasket 245 seals the water tank nozzle 224 and the tube supporter 240 to prevent leakage from being generated between the water tank nozzle 224 and the tube supporter 240.

The water tank nozzle 224 is coupled to the tube supporter 240 when the water tank 220 is placed at the insertion position. When the water tank nozzle 224 is coupled to the tube supporter 240, the water tank nozzle and the connection pipe 25 may be connected to each other and the water may be supplied to the steam generator 21.

When the water tank 220 is moved adjacent to the withdrawal position, the coupling between the water tank nozzle 224 and the tube supporter 240 is released, and thus, the connection between the water tank nozzle 2224 and the connection pipe 25 is released and the water supply to the steam generator 21 is stopped.

The opening 215 may be formed in the housing 210 in which the water tank 220 that has the above-described structure is installed. The opening 215 passes through the upper surface of the housing 210. The opening 215 defines a passage in which the accommodating space in the housing 210 and a portion of the water tank 220 inserted into an inside of the housing 210 are exposed to an upper portion of the housing 210.

The opening 215 is biased to other side in a forward and rearward direction of the housing 210, that is, the rear of the housing 210 and the opening is disposed at a position in which components disposed adjacent to the rear of the housing 210, for example, components such as the outer protrusion of the water tank nozzle 224, the tube supporter 240, the packing gasket 245, and the fixer 270 may be exposed to the upper portion of the housing 210.

The opening 215 formed as described above may be provided as a use of an identification window to identify whether the components is properly installed or the connection between the water tank nozzle 224 and the tube supporter 240 is properly performed, or a use to perform a function as a passage to perform an operation of repair and replace the component such as the fixer 270, when the component such as the fixer 270 is worn and broken.

[Coupling Structure of Water Tank and Connector]

Figure 9:
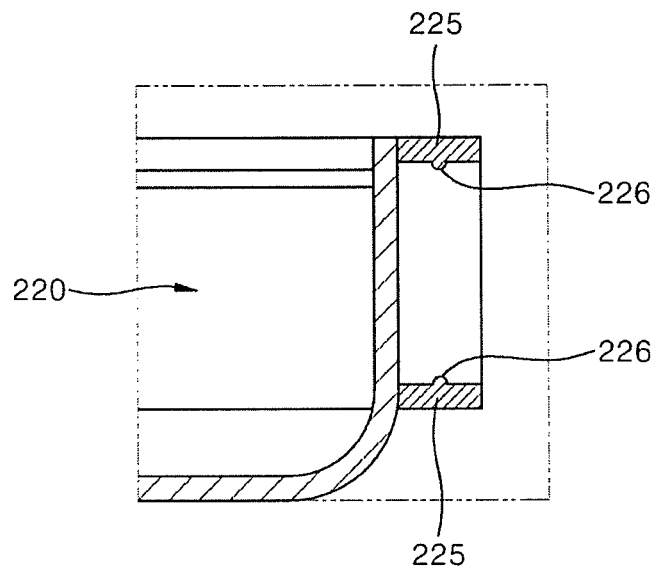
FIG. 9 is a cross-sectional view taken along line "C-C" in FIG. 5.
Figure 10:
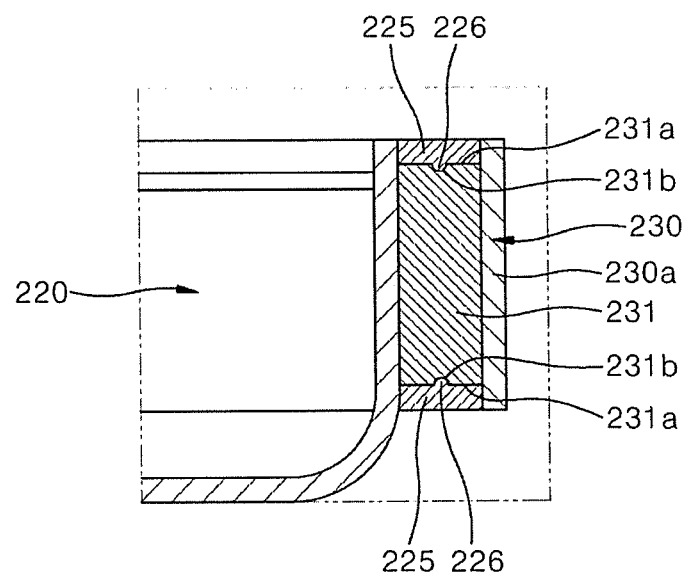
FIG. 10 is a cross-sectional view of a coupling structure between a water tank and a connector shown in FIG. 9.

FIG. 9 is a cross-sectional view taken along line C-C in FIG. 5. FIG. 10 is a cross-sectional view of a coupling structure between a water tank and a connector shown in FIG. 9.

Referring to FIGS. 4 and 9, as described above, protrusion couplers 225 are formed in a lower surface of a lower tank 220a and an upper surface of an upper tank 220b, respectively. The protrusion coupler 225 protrudes from an edge having a curve shape connecting a rear surface of a water tank 220 and a side of a water tank 220 in a plane direction.

A connector 230 movably couples the water tank 220 to the housing 210 and includes a rear frame 230a and a side frame 230b. The rear frame 230a faces the rear surface of the water tank 220. The side frame 230b extends from both ends of the rear frame 230a and faces the side of the water tank 220. In the present embodiment, the connector 230 has a form in which the rear frame 230a and a pair of side frames 230b have "1" shape and are connected to each other. The connector 230 preferably has a form in which the rear frame 230a closely contact the rear surface of the water tank 220 and each side frame 230b closely contacts the side of the water tank 220 when the connector 230 is coupled to the water tank 220.

According to this embodiment, the water tank 220 is coupled to the connector 230 so that the movement of the water tank 220 is performed together with the movement of the connector 230, and the water tank 220 is detachably coupled to the connector 230 so that the connector 230 is separated from the housing 210. A detachable coupling structure between the water tank 220 and the connector 230 is described below.

Referring to FIGS. 4, 9, and 10, a supporting rib 231 protruding inward of the connector 230 is formed in an inner edge of the connector 230 to which the rear frame 230a and the side frame 230b are connected. A rib coupler 231a that provides a coupling surface with the water tank 220, more specifically, the edge protruding surface 225 that protrudes from the water tank 220 is formed in the upper surface and the lower surface of the supporting rib 231, respectively.

Meanwhile, the edge protruding surfaces 225 formed on the lower surface and the upper surface of the water tank 220, that is, the protrusion coupler 225 formed on the lower surface of the lower tank 220a and the protrusion coupler 225 formed on the upper surface of the upper tank 220b are spaced apart from each other by a distance corresponding to a distance between a rib coupler 231 formed on the lower surface of the supporting rib 231 and a rib coupler 231*a* formed on the upper surface of the supporting rib 231.

Further, a coupling boss 226 protrudes, in a surface of the edge protruding surface 225 facing the rib coupler 231*a*. A fitting groove 231*b* into which the fitting boss 226 is fitted is formed concavely in the surface of the supporting rib 231 facing the edge protruding surface 225, that is, the rib coupler 231*a*.

The coupling between the water tank 220 and the connector 230 that has the above-described structure may be performed as follows.

When the water tank 220 is inserted to an inner space of the connector 230 toward an open front of the connector 230 so that the water tank 220 is inserted into the inner space of the connector 230 surrounded by the rear frame 230*a* and the side frame 230*b*, the water tank 220 is coupled to the connector 230 in a form in which the connector 230 surrounds the rear side and both sides of the water tank 220 in a "⊏" shape.

At this time, when the water tank 220 is pushed into the inner space of the connector 230 until the rear surface of the water tank 220 reaches the rear frame 230*a*, the coupling between the edge protruding surface 225 and the supporting rib 231 is performed. The coupling between the edge protruding surface 225 and the supporting rib 231 is performed in a form in which the supporting rib 231 is inserted into a space between the edge protruding surfaces 225 provided on the lower surface and the upper surface of the water tank 220, respectively. At this time, the detachable coupling between the edge protruding surface 225 and the supporting rib 231 may be performed in a form in which the edge protruding surface 225 closely contact the rib coupler 231*a* so that the edge protruding surface 225 and the rib coupler 231*a* perform a surface contact and the coupling boss 226 is fitted into the fitting groove 231*b*.

According to the above, the detachable coupling between the edge protruding surface 225 and the supporting rib 231 is performed by the fitting between the coupling boss 226 and the fitting groove 231*b*. At this time, it is preferable that a contact surface in which the coupling boss 226 contacts the supporting rib 231 is rounded so that a sliding in the edge protruding surface 225 and the removal from the fitting groove 231*b* are smoothly performed.

A detachable coupling structure between the water tank 220 and the connector 230 may be provided through the detachable coupling between the edge protruding surface 225 and the supporting rib 231. The water tank 220 may be easily and quickly removed from the connector 230 and the housing 210 by the detachable coupling structure between the water tank 220 and the connector 230, and thus, an operation of removing the water tank 220 from the housing 210 is performed very easily and quickly for washing or repair.

<Moving Structure of Water Tank and Connector>

Figure 11:
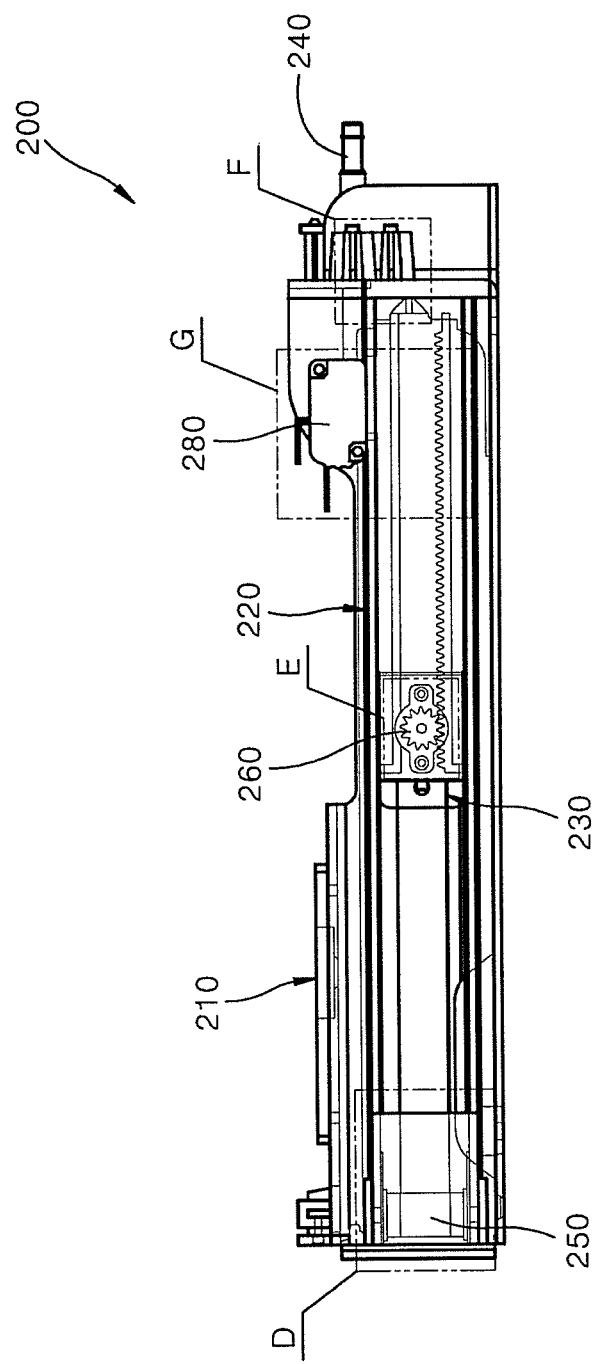
FIG. 11 is a side view of an inner structure of the water supply device shown in FIG. 2.
Figure 12:
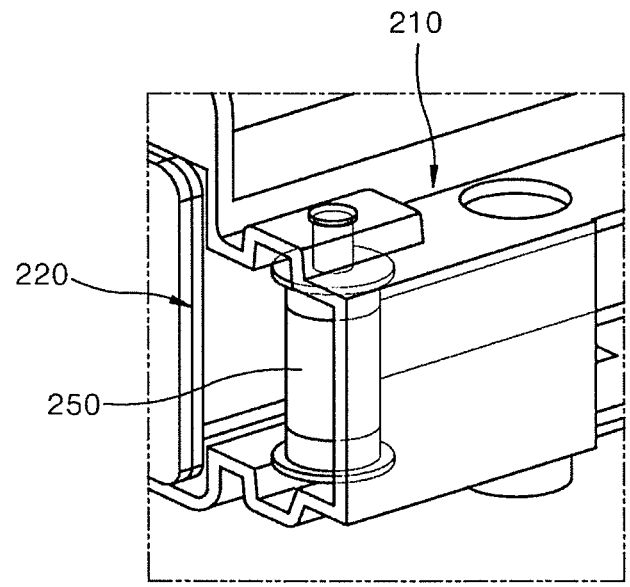
FIG. 12 is an enlarged perspective view of portion of "D" in FIG. 11.
Figure 13:
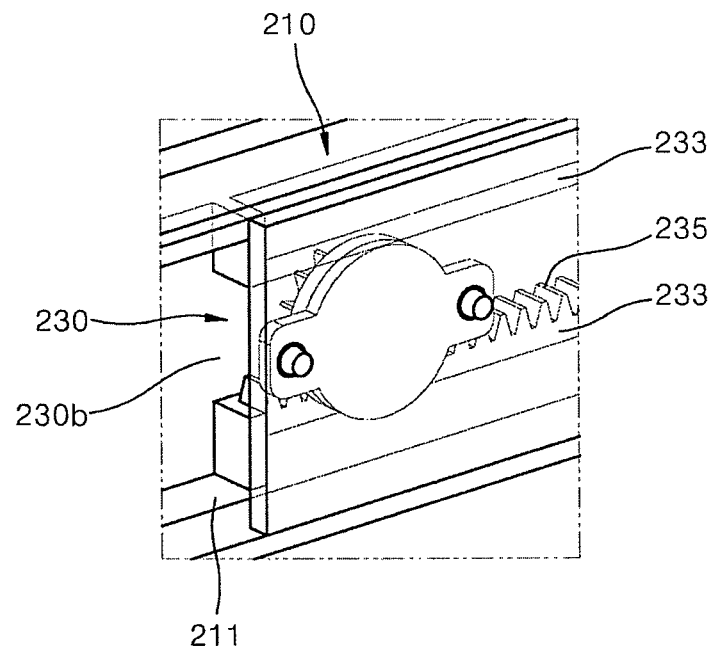
FIG. 13 is an enlarged perspective view of portion of "E" in FIG. 11.

FIG. 11 is a side view of an internal structure of the water supply device shown in FIG. 2. FIG. 12 is an enlarged perspective view of portion "D" in FIG. 11. FIG. 13 is an enlarged perspective view of portion "E" in FIG. 11.

Referring to FIGS. 4 and 11, a sliding boss 233 is provided on each side frame 230*b* of a connector 230 and a sliding rail 211 is formed on each side of a housing 210.

Each of the sliding bosses 233 is provided on a side frame 230*b* and protrudes toward the side of the housing 210 facing the side frame 230*b* and protrudes such that the sliding boss 233 is inserted in to the sliding rail 211 formed at the side of the housing 210.

Each of the sliding rails 211 extends forward and rearward on the respective sides of the housing 210 facing the side frame 230*b*. The sliding boss 233 is slidably coupled to each of the sliding rails 211.

The connector 230 may be slidably coupled to the housing 210 in the forward and rearward directions by the slidable coupling between the sliding boss 233 and the sliding rail 211, and the tank 220 coupled to the connector 230 may be installed in the housing 210 so that the position of the water tank 220 may be changed in the forward and rearward direction along the connector 230.

As described above, the connector 230 is formed such that a supporting rib 231 protrudes from an inner edge of the connector 230 and a sliding boss 233 protrudes from a side of the connector 230. As described above, the supporting rib 231 and the sliding boss 233 formed on the connector 230 also functions as a structure for a detachable coupling between the connector 230 and the water tank 220, a structure for a slidable coupling between the connector 230 and the housing 210, as well as providing a function as a rib structure to enhance rigidity of the connector 230.

That is, the connector 230 stably performs the coupling between the housing 210 and the water tank 220 through a structure protruding from the edge and the side of the connector 230, such as the supporting rib 231 and the sliding boss 233, as well as having a thin thickness, a light form, and enhanced rigidity.

Meanwhile, referring to FIGS. 4, 11 and 12, in the present embodiment, the water supply device 200 may further include a power generator 250.

The power generator 250 provides a power to move the water tank 220 adjacent to the withdrawal position. The power generator 250 may include an elastic member that generates an elastic force in a direction to move the connector 230 forward.

In the present embodiment, the power generator 250 includes a cylindrical member rotatably installed in the housing 210 and an elastic member that is installed to be wound around the cylindrical member. The elastic member provided in the power generator has a shape of a belt that has a length extending forward and rearward, and one side of the elastic member is coupled to the cylindrical member rotatably installed in the housing 210, and the other side of the elastic member is installed to be coupled to the side frame 230*b* of the connector 230.

The elastic member is wound around the cylindrical member when the connector 230 and the water tank 220 are placed at the withdrawal position and is untied from the cylindrical member when the connector 230 moves rearward toward the insertion position, and a distance between one side thereof and the other side thereof is increased, to generate an elastic force to move back the connector 230 forward.

That is, the connector 230 and the water tank 220 connected to the connector 230 may be slidably installed in the housing 210 in the forward and rearward direction by a sliding coupling between the sliding boss 233 and the sliding rail 211. When the connector 230 and the water tank 220 installed as described above are moved rearward, an elastic force to move the connector 230 and the water tank 220 forward is generated by the power generator 250. When the fixed state of the connector 230 and the water tank 220 which are fixed at the insertion position by the coupling with the fixer 270 to be described below is released, the elastic force generated by the power generator 250 is acted onto the connector 230 so that the connector 230 and the water tank 220 are moved forward toward the withdrawal position.

Meanwhile, referring to FIGS. 4, 11, and 13, a configuration to adjust a moving speed of the connector 230 and the water tank 220 coupled to the connector 230 is provided between the housing 210 and the connector 230.

According to the above, a rack member 235 protrudes toward the side of the housing 210, in the side frame 230b, and a damper 260 is installed at the side of the housing 210.

The rack member 235 has a length extending in the forward and rearward direction, and a plurality of teeth are formed in the rack member 235 along the longitudinal direction thereof.

The damper 260 is installed at the side of the housing 210 that faces the rack member 235 and rotates in engagement with the rack member 235 to prevent the connector 230 from moving. According to the present embodiment, the damper 260 selectively applies a resistance only to the movement of the connector 230 toward the front of the connector 230.

For example, in the damper 260, a highly viscous working fluid is filled in the casing that defines an appearance of the damper 260, and a plurality of rotating members are rotatably installed in the case filled with the working fluid, and the damper 260 includes a shaft that is coupled to the rotating member to rotate with the rotating member and protrudes to an outside of the case and a pinion that is installed in the shaft to rotate with the shaft to be engaged with the rack member 235.

According to this damper 260, when the rotating member is rotated in one direction along the shaft, the damper 260 has a shape that receives a relatively greater resistance from the working fluid, so that the damper 260 acts as a resistance against a forward movement of the connector 230, as the rotation in one direction of the shaft is performed at lower speed than the rotation in a reverse direction thereof even when the rotational force is input.

Accordingly, the connector 230 and the water tank 220 coupled to the connector 230 may be installed in the housing 210 to be movable forward and rearward, and may be installed such that the forward moving speed toward the extended position is reduced. As a result, when the water tank 220 moves forward, the movement speed of the water tank 220 is reduced and the water tank 220 may be smoothly withdrawn.

[Fixing Structure of Connector and Water Tank]

Figure 14:
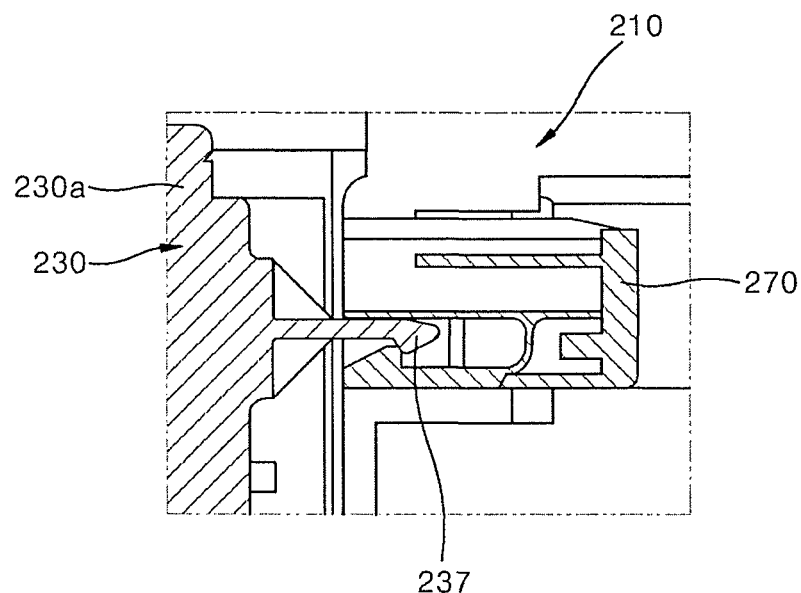
FIG. 14 is an enlarged perspective view of portion of "F" in FIG. 11.

FIG. 14 is an enlarged perspective view of portion "F" in FIG. 11.

Referring to FIGS. 4, 11, and 14, a configuration that fixes positions of a connector 230 and a water tank 220 at an insertion position may be provided between a housing 210 and the connector 230. In this embodiment, a fixing boss 237 is provided in the connector 230 and a fixer 270 is provided in the housing 210 as configurations to fix positions of the connector 230 and the water tank 220 at the insertion position.

The fixing boss 237 is provided on the connector 230, more specifically, on a rear frame 230a, and protrudes toward a rear side of the connector 230. In this embodiment, the fixing boss 237 has a hook shape.

The fixer 270 is installed adjacent to the rear side of the housing 210 that faces the fixing boss 237. The fixer 270 is coupled to the fixing boss 237 and fixes positions of the connector 230 and the water tank 220 coupled to the connector 230 when the water tank 220 is positioned at the insertion position.

The fixer 270 is detachably coupled to the hook-shaped fixing boss 237 to selectively fix the positions of the connector 230 and the water tank 220 coupled to the connector 230. In this embodiment, a mechanism in which the coupling and the release of the fixing boss 237 and a latch mechanism are sequentially performed by repeating a pressing operation with respect to a front surface of the water tank 220 connected to the fixing boss 237 via the connector 230 is used as a latch mechanism.

As a result, the water tank 220 may be installed in the housing 210 to be movable forward and rearward through the connector 230 to be inserted into the housing 210 or to be withdrawn so that an inlet 221 is exposed to the outside, while the water tank 220 may stably maintain a state in which the water tank 220 is inserted at the insertion position via a detachable coupling between the fixing boss 237 and the fixer 270 and may easily and conveniently be withdrawn to the withdrawal position, as necessary. The power to move the connector 230 and the water tank 220 to the withdrawal position, when the coupling between the fixing boss 237 and the fixer 270 is released, is provided by the power generator 250 described above. At this time, the moving speed of the connector 230 and the damper 220 is reduced by an action of the water tank 260 so that the water tank 220 may be withdrawn smoothly and generally.

[Structure of Detecting Position of Water Tank]

Figure 15:
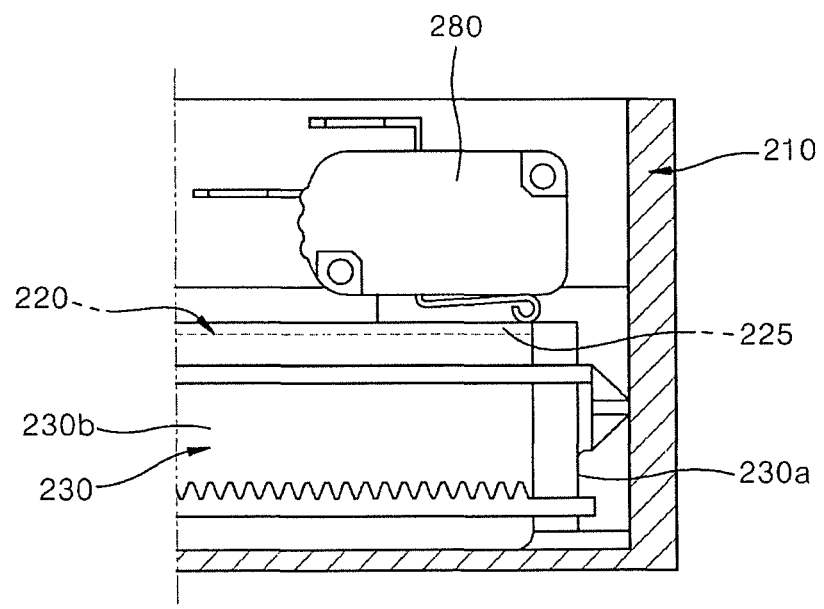
FIG. 15 is an enlarged perspective view of portion of "G" in FIG. 11.

FIG. 15 is an enlarged perspective view of portion "G" in FIG. 11.

Referring to FIGS. 4, 11, 15, a configuration to detect a position of a water tank 220 may be further provided between a housing 210 and the water tank 220. According to the above, an insertion detector 280 is installed in the housing 210 to detect whether the position of the water tank 220 is an insertion position.

In this embodiment, the insertion detector 280 includes a contact type switch to detect the position of the water tank 220 by contacting the water tank 220 when the water tank 220 is at the insertion position. In this case, when the water tank 220 is at the insertion position, it is preferable that the insertion detector 280 contacts a rearmost portion of the water tank 220, for example, the edge protruding surface 225 that protrudes from the water tank 220 and detect that the water tank 220 is at the insertion position.

As another example, the insertion detector 280 contacts the connecter 230 rather than the water tank 220 to indirectly detect the position of the water tank 220. However, in consideration of a possibility that the connector 230 is moved when the water tank 220 is deviated to some extent or completely deviated from a normal position in which the water tank 220 is connected to the connector 230 depending on a situation, instead of such a form, it is more preferable that the insertion detector 280 directly contacts the water tank 220 and detects the position of the water tank 220.

According to the present embodiment, when the water tank 220 is positioned at the insertion position, the water tank nozzle 224 and the connection pipe 25 are connected to each other and the water supply to the steam generator 21 (see FIG. 1) may be performed. The connection between the water tank nozzle 224 and the connection pipe 25 is released and the water supply to the steam generator 21 is stopped when the water tank 220 moves to the withdrawal position and deviates from the insertion position.

That is, as shown in FIGS. 1, 11 and 15, when the water tank 220 deviates from the insertion position, the water may not be supplied to the steam generator 21. When the water tank 220 is at the insertion position, the water supply to the steam generator 21 may be performed. Whether the water supply to the steam generator 21 may be performed may be determined, by the insertion sensor, by detecting whether the position of the water tank 220 is the insertion position.

Meanwhile, the steam generator 21 connected to the water tank 220 through the connection between the water tank nozzle 224 and the connection pipe 25 is operated when the insertion detector 280 detect that the water tank 220 is at the insertion position.

Accordingly, when the insertion detector 280 detects that the water tank 220 is placed at the insertion position, that is, only when the water tank nozzle 224 and the connection pipe 25 are connected to each other so that the water supply to the steam generator 21 is performed, the steam heater 23 is operated to heat the water stored in the heating tank 22, and when the connection between the water tank nozzle 224 and the connection pipe 25 is released and the water supply to the steam generator 21 is not performed, the power supply to the steam heater 23 is prevented so that the steam heater 23 is not operated.

As a result, even though the water supply to the steam generator 21 is not performed and the steam heater 23 is operated, the steam heater 23 is prevented from being unnecessarily operated when generating the steam is difficult, thereby preventing the power waste due to unnecessary operation of the steam heater 23 and occurrence of safety accidents due to overheating of the steam heater 23 in advance.

[Action and Effect of Steam Supply Device]

Figure 16:
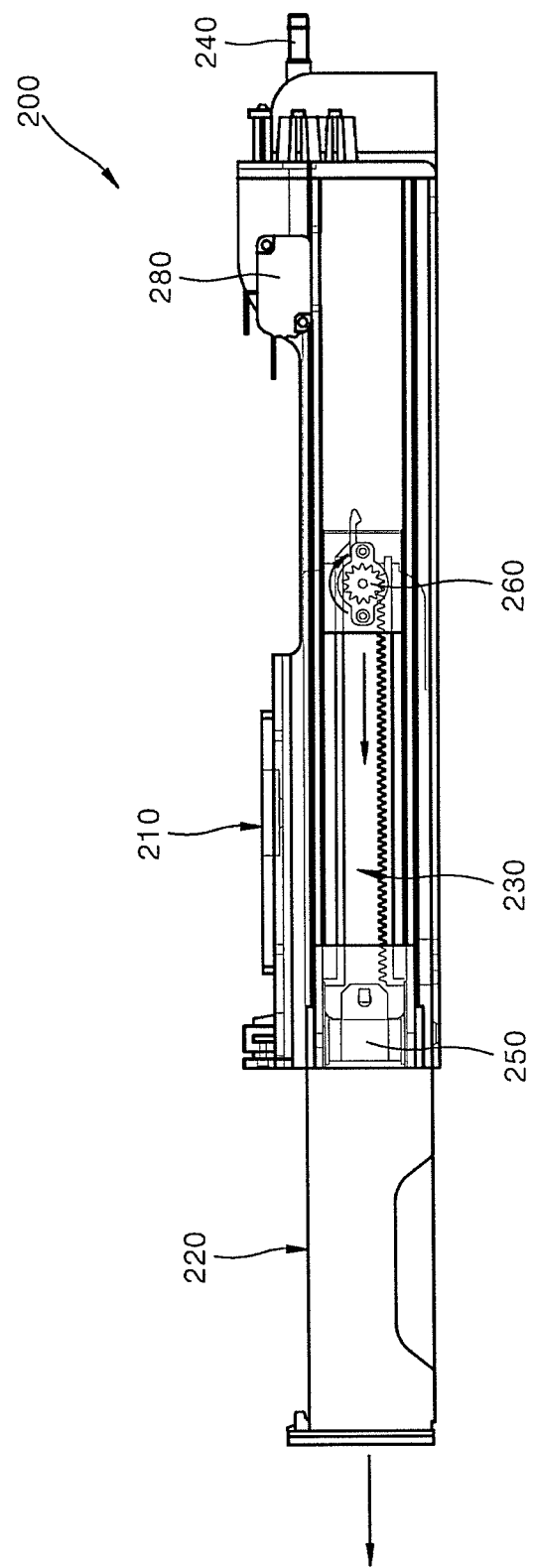
FIG. 16 is a side view of a state in which a water tank is withdrawn from the water supply device shown in FIG. 11.

FIG. 16 is a side view of a state in which a water tank is withdrawn from a water supply device shown in FIG. 11.

Hereinafter, operation and effects of the steam supply device according to the present embodiment will be described with reference to FIGS. 1 to 16.

Referring to FIG. 1, in this embodiment, a steam supply device 20 may be installed inside of a main body 10 of a cooking device, and a steam generator 21 may be installed below a cooking chamber 11 and a water supply device 200 may be disposed at a front of the main body 10.

The water supply device 200 stores and supplies water to be supplied to the steam generator, and as shown in FIGS. 1 to 4, a water tank 220 is withdrawably installed in a housing 210 installed in the main body 10.

The water tank 220 is installed in the housing 210 so that a position of the water tank 220 is changed to an insertion position and a withdrawal position. When the water tank 220 is fixed at the insertion position, the water tank nozzle 224 and the connection pipe 25 are connected to each other and the water supply to the steam generator 21 is performed. When the water tank 220 is withdrawn to the withdrawal position, a user may input water into an inside of the water tank 220 through an inlet 221 exposed to the outside.

In this embodiment, in the water supply device 200, a water tank 220 that receives and stores the water to be supplied to the steam generator 21 and a connector 230 that movably couples the water tank 220 to the housing 210 are provided separately and are detachably coupled to each other.

According to the present embodiment, as shown in FIGS. 4, 9, and 10, a detachable coupling structure between the water tank 220 and the connector 230 is provided through a detachable coupling between the edge protruding surface 225 and the supporting rib 231. The water tank 220 may be easily and quickly removed from the connector 230 and the housing 210 as necessary by the detachable coupling structure between the water tank 220 and the connector 230 provided as described above.

As described above, as the water tank 220 and the connector 230 are separately provided, the two components, which are excessively complicated in shape and structure when they are integrally formed, may be separately manufactured to improve the productivity of the water supply device 200 and lower the manufacturing cost of the water supply device 200 and to lower a difficulty in a repair operation of the water supply device 200 and a repair cost of the water supply device 200 of by separating parts that have a high risk of breakage in a structure thereof, such as the connector 230, and to easily and quickly perform an operation of removing the water tank 220 from the housing 210 for washing or repair.

As shown in FIG. 3, when the user pours water toward the inlet 221 in a state in which the water tank 220 is withdrawn to the withdrawal position, as shown in FIG. 7, an opening and closing holder 223 is rotated by a weight of water poured into the inlet 221 to open the inlet 221, and the water poured into the inlet 221 may be introduced into the water tank 220 through the open inlet 221 and may be stored in a storage space inside of the water tank 220.

As shown in FIG. 6, when the supplement of the water is completed and introducing the water is stopped, the opening and closing holder 223 rotates back in the closing direction and automatically closes the inlet 221, and thus, foreign matters are prevented from being introduced into the water tank 220 when the water is stored in the water tank 220.

After the water supply to the water tank 220 is completed, when the user pushes the water tank 220 to the rear side, the water tank 220 and the connector 230 move to the rear side. When the water tank 220 and the connector 230 move until the water tank 220 reaches the insertion position, as shown in FIGS. 11 and 14, the water tank 220 is fixed onto the housing 210 so that a state in which the water tank 220 is placed at the insertion position is maintained as the fixing boss 237 that protrudes from a rear side of the connector 230 and a fixer 270 installed in the housing 210.

As described above, as shown in FIGS. 1, 4 and 15, when the water tank 220 is at the insertion position, the water tank nozzle 224 and the connection pipe 25 are connected to each other, and the water supply to the water tank 21 may be performed, and this may be detected by the insertion detector 280 that detects whether the position of the water tank 220 is the insertion position.

According to the present embodiment, when the insertion detector 280 detects that the water tank 220 is positioned at the insertion position, that is, the water tank nozzle 224 and the connection pipe 25 are connected to each other and water supply to the steam generator 21 is performed, the steam heater 23 is operated to heat the water stored in the heating tank 22. When the connection between the water tank nozzle 224 and the connection pipe 25 is released and the water supply to the steam generator 21 is not performed, the power supply to the steam heater 23 is prevented so that the operation of the steam hater 23 is not performed.

As a result, the water supply to the steam generator 21 is not performed and the steam heater 23 is prevented from being unnecessarily operated when it is difficult to generate the steam even when the steam heater 23 is operated, thereby preventing the power from being wasted due to the unnecessary operation of the steam hater 23 and safety accidents from being occurring due to overheating of the steam heater 23 in advance.

As described above, in a state in which the water supply device 200 and the steam generator 21 are connected to each other so that water may be supplied to the steam generator 21, when the user operates the cooking device so that the operation related to steam cooking is performed, the water introduced into the heating tank 22 from the water supply device 200 is heated by the steam heater 23 to generate the steam, and the steam generated as described above is introduced into the cooking chamber 11, to perform cooking using the steam in a manner in which the generated steam circulates through the cooking chamber 11.

Meanwhile, the water tank 220 may be withdrawn to supplement the water, wash the water tank 220, or wash or repair the water supply device 200. In this embodiment, the withdrawal of the water tank 220 may be performed by a pressing operation with respect to the front surface of the water tank 220.

According to the above, as shown in FIGS. 11 and 14, when the user performs the pushing operation with respect to the front surface of the water tank 220 in a state in which the fixing boss 237 is coupled to the fixer 270, the coupling between the fixing boss 237 and the fixer 270 is released.

As shown in FIG. 12, as described above, when the coupling between the fixing boss 237 and the fixer 270 is released, an elastic power of the power generator 250 accumulated during movement of the water tank 220 to the insertion position is acted as a power to move the connector 230 and the water tank 220 coupled to the connector 230 forward. As shown in FIG. 16, the connector 230 and the water tank 220 move forward toward the withdrawal position by the power acted as described above.

The connector 230 and the water tank 220 that move as described above are affected by the damper 260 that provides a resistance force to the forward movement of the connector 230, and the moving speed of the water tank 220 is reduced when the tank 220 moves forward, so that the tank 220 may be smoothly withdrawn.

As described above, in this embodiment, according to the water supply device, the steam supply device and the cooking device that has the water supply device, multiple functions, such as a function for fixing the water tank into the main body or withdrawing the water tank from the main body by a simple pressing operation, a function for easily and conveniently introducing water into the water tank without an additional operation to open and close the inlet as well as effectively preventing the foreign matters from being introduced in the water tank, a function for controlling an operation of the steam supply device according to the position of the water tank, and a function for smoothly withdrawing the water tank are implemented with one water supply device, thereby providing improved use convenience to the user.

Further, according to this embodiment, in the water supply device, the steam supply device and the cooking device that has the water supply device, the water tank and the connector are provided as separate parts from each other so that the water tank and the connector are detachably coupled to each other and the water tank is movably installed in the housing through the connector to thereby lower the manufacturing cost of the water supply device and improve the productivity of the water supply device, and to lower the difficulty in the repair operation of the water supply device and lower the repair cost of the water supply device, as well as easily and quickly performing the operation of removing the water tank for washing or repair, and the like.

Further, according to this embodiment, in the water supply device, the steam supply device and the cooking device that has the water supply device, it is possible to prevent the steam heater from being unnecessarily operated when the water supply may not be performed, thereby preventing the power from being wasted due to the unnecessary operation of the steam heater and safety accidents from occurring due to the overheating of the steam heater.

While the present disclosure has been described with reference to exemplary embodiments shown in the figures, it is merely illustrative, and it will be understood by the skilled person in the art that various modifications and equivalent other embodiments may be made. Thus, a true technical scope of the present disclosure should be defined by the following claims.

DESCRIPTION OF SYMBOLS

10: Main body
11: Cooking chamber
12: Door
13: Handle
15: Convection heater
20: Steam supply device
21: Steam generator
22: Water tank
23: Steam heater
25: Connection pipe
200: Water supply device
210: Housing
211: Sliding rail
220: Water tank
220a: Lower tank
220b: Upper tank
220c: Packing
221: Inlet
222: Inclined surface
223: Opening and closing holder
223a: Cover
223b: Hinge
223c: Extension
224: Water tank nozzle
224a: Boss
225: Edge protruding surface
226: Coupling boss
227: Decorative panel
230: Connector
230a: Rear frame
230b: Side frame
231: Supporting rib
231a: Rib coupler
231b: Fitting groove
233: Sliding boss
235: Rack member
237: Fixed boss
240: Tube supporter
250: Power generator
260: Damper
270: Fixer
280: Insertion detector

The invention claimed is:

1. A water supply device, comprising:
a housing disposed in a main body of a cooking device and to define an accommodating space, and one side of the housing is opened to outside of the main body;
a water tank that defines a storage space to store water and has an inlet to introduce water into the storage space, and the water tank is disposed with respect to the housing to change between an insertion position of the water tank and a withdrawal position of the water tank, the insertion position including that the inlet is provided in the accommodating space and the withdrawal position including that the inlet is exposed to an outside of the accommodating space; and
a connector disposed at the housing to allow the water tank be movable forward and rearward with respect to the accommodating space, the water tank to move in a forward direction to change the position of the water tank from the insertion position to the withdrawal position, and the water tank to move in a rearward direction to change the position of the water tank from the withdrawal position to the insertion position, wherein the connector includes a rear frame that faces a rear surface of the water tank and first and second side frames, the rear frame and the first and second side frames formed in a "C" shape, the rear frame includes a first end, a second end, and a frame that extends from the first end to the second end, the first side frame to extend in the forward direction from the first end of the rear frame and face a first side of the water tank and is movably coupled to the housing, and the second side frame to extend in the forward direction from the second end of the rear frame and face a second side of the water tank and is movably coupled to the housing, wherein the connector is to cover the first and second sides and the rear surface of the water tank, wherein the first side frame and the second side frame are connected by the rear frame in the "C" shape so that the first side frame and the second side frame move together with the rear frame, wherein the water tank is coupled to the connector such that movement of the water tank occurs with movement of the connector, and the water tank is coupled to the connector such that the rear frame and the first and second side frames to surround the rear surface and the first and second sides of the water tank, wherein when the water tank is in the insertion position, the entire connector is inside of the accommodating space, and wherein when the water tank is detached from the connector, the connector is configured to move inside the housing without the water tank.

2. The water supply device of claim 1,
wherein the water tank includes a water tank nozzle that defines a passage to move the water from the storage space to outside of the water tank, and the water tank nozzle to protrude in the rearward direction,
wherein a tube supporter is disposed at the housing, and is detachably coupled to the water tank nozzle, and
wherein when the water tank is in the insertion position, the water tank nozzle is coupled to the tube supporter.

3. The water supply device of claim 1, wherein the water tank is detachably coupled to the connector so that the connector is separated from the housing.

4. The water supply device of claim 3,
wherein the first side frame includes a rack member extending forward and rearward, and
wherein a damper is engaged with the rack member and provides a damping force to prevent movement of the connector.

5. The water supply device of claim 1, wherein a supporting rib protrudes inwardly from an inner edge of the connector where the rear frame is connected to the first side frame.

6. The water supply device of claim 5,
wherein a first rib coupler is to provide a coupling surface with the water tank by being provided on an upper surface of the supporting rib, a first edge protruding surface of the water tank is to protrude from an upper surface of the water tank and to couple to the first rib coupler, and
wherein a second rib coupler is to provide a coupling surface with the water tank by being provided on a lower surface of the supporting rib, a second edge protruding surface of the water tank is to protrude from a lower surface of the water tank and to couple to the second rib coupler.

7. The water supply device of claim 6,
wherein a coupling boss is disposed on the first edge protruding surface of the water tank facing the first rib coupler, and the coupling boss to protrude from the first edge protruding surface, and
wherein the first rib coupler is concavely disposed in a fitting groove to which the coupling boss is fitted.

8. The water supply device of claim 6,
wherein the water tank includes a lower tank having a box shaped upper portion and an upper tank coupled above the lower tank to cover an opened upper portion of the lower tank,
wherein the second edge protruding surface of the water tank is disposed at a lower surface of the lower tank, and the first edge protruding surface of the water tank is disposed at an upper surface of the upper tank, and
wherein the second edge protruding surface of the lower tank is spaced apart from the first edge protruding surface of the upper tank by a distance corresponding to a distance between the first rib coupler and the second rib coupler.

9. The water supply device of claim 1, further comprising a power generator that provides power to move the water tank.

10. The water supply device of claim 9, wherein the power generator includes an elastic member having a first side coupled to the housing and a second side coupled to the connector, and when the connector moves in the rearward direction, a distance between the first side and the second side of the elastic member is increased to generate an elastic force in a direction of moving the connector forward.

11. The water supply device of claim 1, further comprising an opening and closing holder rotatably disposed in the water tank to open and close the inlet,
wherein the opening and closing holder includes:
a cover that covers below the inlet,
an extension that extends from the cover, and
a hinge disposed between the cover and the extension to rotatably couple the opening and closing holder to the water tank.

12. The water supply device of claim 1,
wherein the connector includes a fixing boss that protrudes adjacent to the rear side of the connector, and
wherein a fixer is disposed in the housing and is coupled to the fixing boss, and the fixer is to fix positions of the connector and the water tank when the water tank is in the insertion position.

13. A water supply device, comprising:
a housing disposed in a main body of a cooking device and to define an accommodating space, and a front of the housing is opened to outside of the main body;
a water tank that defines a storage space to store water and is disposed in the accommodating space such that the water tank is withdrawn to outside of the housing and the main body through the opened front of the housing; and
a connector disposed at the housing to allow the water tank to be movable forward and rearward with respect to the accommodating space, the water tank to move in a forward direction or a rearward direction to change a position of the water tank with respect to the accommodating space,
wherein the connector includes a rear frame that faces a rear surface of the water tank and first and second side frames, the rear frame and the first and second side frame formed in a "C" shape, the rear frame includes a first end, a second end, and a frame that extends from the first end to the second end, the first side frame to extend in the forward direction from the first end of the rear frame and face a first side of the water tank and is movably coupled to the housing, and the second side frame to extend in the forward direction from the second end of the rear frame and face a second side of the water tank and is movably coupled to the housing, wherein the connector is to cover the first and second sides and the rear surface of the water tank, wherein the first side frame and the second side frame are connected by the rear frame in the "C" shape so that the first side frame and the second side frame move together with the rear frame, wherein the water tank is coupled to the connector such that movement of the water tank occurs with movement of the connector, and the water tank is coupled to the connector such that the rear frame and the first and second side frames to surround the rear surface and the first and second sides of the water tank, wherein when the water tank is in the accommodating space, the connector is not exposed to the outside of the main body wherein when the water tank is detached from the connector, the connector is configured to move inside the housing without the water tank.

14. A water supply device, comprising:

a housing disposed in a main body of a cooking device, and to define an accommodating space, and one side of the housing is opened to outside of the main body;

a water tank that defines a storage space to store water and includes an inlet to introduce water into the storage space in the front thereof, and the water tank is disposed with respect to the housing to change between an insertion position of the water tank and a withdrawal position of the water tank, the insertion position including that the inlet is provided in the accommodating space and the withdrawal position including that the inlet is exposed to an outside of the accommodating space;

a connector disposed at the housing to allow the water tank to be movable forward and rearward with respect to the accommodating space, and the water tank to move in a forward direction or a rearward direction to change the position of the water tank to be one of the insertion position and the withdrawal position; and a power generator that provides power to move the water tank to the withdrawal position, wherein the connector is formed in a "C" shape to cover side surfaces and rear surface of the water tank, wherein a fixer is disposed in the housing, and is coupled to the connector, and the fixer is to fix the positions of the connector and the water tank when the water tank is in the insertion position, wherein the power generator includes an elastic member having a first side coupled to the housing and a second side coupled to the connector, and when the connector moves in the rearward direction, a distance between the first side and the second side of the elastic member is increased, to generate an elastic force in a direction of moving the connector forward, wherein the connector includes a structure to movably couple the water tank to the housing, a structure to connect the second side of the elastic member to the connector, and a fixing boss coupled to the fixer such that the positions of the connector and the water tank are fixed when the water tank is in the insertion position, and wherein the water tank is coupled to the connector such that movement of the water tank occurs with movement of the connector, and is detachably coupled to the connector such that the connector is separated from the housing, wherein when the water tank is detached from the connector, the connector is configured to move inside the housing without the water tank.

* * * * *